(12) United States Patent
Fukuhara (10) Patent No.: US 11,768,639 B2
(45) Date of Patent: Sep. 26, 2023

(54) PRINTER AND COMPONENT REPLACEMENT RECOMMENDATION METHOD

(71) Applicant: TOSHIBA TEC KABUSHIKI KAISHA, Tokyo (JP)

(72) Inventor: Takanori Fukuhara, Mishima Shizuoka (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/972,819

(22) Filed: Oct. 25, 2022

(65) Prior Publication Data
US 2023/0229366 A1 Jul. 20, 2023

(30) Foreign Application Priority Data
Jan. 17, 2022 (JP) .................. 2022-004895

(51) Int. Cl.
*G06F 3/12* (2006.01)
(52) U.S. Cl.
CPC .......... *G06F 3/1229* (2013.01); *G06F 3/1203* (2013.01); *G06F 3/1218* (2013.01)
(58) Field of Classification Search
CPC ..... G06F 3/1229; G06F 3/1203; G06F 3/1218
(Continued)

(56) References Cited

U.S. PATENT DOCUMENTS 4,585,327 A * 4/1986 Suzuki ............... G03G 21/1875
399/26
4,751,484 A * 6/1988 Matsumoto ............ G03G 15/50
399/388

(Continued)

FOREIGN PATENT DOCUMENTS

| JP | 2010-208076 A | 9/2010 |
|----|---------------|--------|
| JP | 2012-177748 A | 9/2012 |
| JP | 2014-019080 A | 2/2014 |

OTHER PUBLICATIONS

Extended European Search Report dated Jun. 15, 2023 issued in European Patent Application No. 22213688.9, 9 pages.
2007/0127934
A1
*
6/2007
Shoji ....................................... G06F 11/0754
399/9

*Primary Examiner* — Allen H Nguyen
(74) *Attorney, Agent, or Firm* — FOLEY & LARDNER LLP (57) ABSTRACT

A printer, capable of appropriately extending an existing replacement recommendation time of a component determined based on a life prescribed for the component, includes: a time determination unit (timer), a comparison examination unit (comparator), and a notification unit (notifier). The timer determines a time at which replacement of a component is recommended based on tendency information indicating a deterioration tendency of the component with respect to an operation status. The tendency information is generated from collection and storage of information on the operation status collected from a plurality of printers and information on a degree of deterioration at a disposal time of the component. The comparator compares a time output by the time determination unit with a predetermined life of the component, and examines whether to perform recommendation for component replacement. The notifier notifies of information on recommendation for component replacement based on an examination result of the comparator.

18 Claims, 4 Drawing Sheets

(58) Field of Classification Search
USPC .......................................................... 358/1.15
See application file for complete search history.

(56) References Cited

U.S. PATENT DOCUMENTS

2020/0257586 A1   8/2020   Kobayashi
2021/0397392 A1   12/2021  Adachi et al.

* cited by examiner

A: REPLACEMENT TIME BASED ON STANDARD OF COMPONENT
B: REPLACEMENT TIME ESTIMATED FROM OPERATION STATUS

PRINTER AND COMPONENT REPLACEMENT RECOMMENDATION METHOD

CROSS-REFERENCE TO RELATED APPLICATION

This application is based upon and claims the benefit of priority from Japanese Patent Application No. 2022-004895, filed on Jan. 17, 2022, the entire contents of which are incorporated herein by reference.

FIELD

Embodiments described herein relate generally to a printer and a component replacement recommendation method.

BACKGROUND

A life (for example, a service life) of a component constituting an apparatus such as a printer is prescribed as a specification or a standard. In the existing procedure, when the life is almost expired, the apparatus notifies a user that a replacement time has arrived. The notification is generally performed by a method of displaying information in an image or characters on a display device included in the apparatus or a method of causing information to be uttered by a speaker or a buzzer.

DETAILED DESCRIPTION

In connection with the foregoing, the life prescribed for a component is generally expected to have a safety factor since the life is determined regardless of which apparatus the component is assembled into. Therefore, in an apparatus such as a printer, when a serviceperson performs maintenance based on a recommendation as described above, a component to be replaced with a new component and discarded may be still durable for a considerable period of time. It is not desirable that the time for component replacement as recommended is fairly early, not only for a user who uses the apparatus but also for the serviceperson who performs maintenance.

In such a situation, various techniques for detecting or estimating a deterioration (or wear) state of a component and notifying of the deterioration (or wear) state of the component are proposed. However, for example, for a printer, if the life is prescribed by an upper limit value of the number of printed sheets, a rotation speed of a drive system and the like, the deterioration (or wear) state may vary between a case where an operation continues for a long time and a case where a total of intermittent operations reaches the upper limit value, and a replacement recommendation time may be not appropriate. Therefore, it is desirable to derive the replacement recommendation time based on a comprehensive determination including an operation status of the apparatus and the like.

However, in order to prepare an environment in which the replacement recommendation time based on the comprehensive determination as described above can be derived, there are many problems such as a change in a current routine, and cost is required for implementation. Therefore, it is desirable to consider a method for cost collection as well.

According to at least one embodiment, a printer capable of appropriately extending an existing replacement recommendation time of a component determined based on a life prescribed for the component is provided.

According to at least one embodiment, a printer includes a time determination unit (timer), a comparison examination unit (comparator), and a notification unit (notifier). The time determination unit determines a time at which replacement of a component is recommended based on tendency information indicating a deterioration tendency of the component with respect to an operation status. The tendency information is generated from collection and storage of information on the operation status collected from a plurality of printers and information on a degree of deterioration at a disposal time of the component. The comparison examination unit compares a time output by the time determination unit with a prescribed life of the component, and examines whether to perform recommendation for component replacement. The notification unit notifies of information on recommendation for component replacement based on an examination result of the comparison examination unit.

First Embodiment

Figure 1:
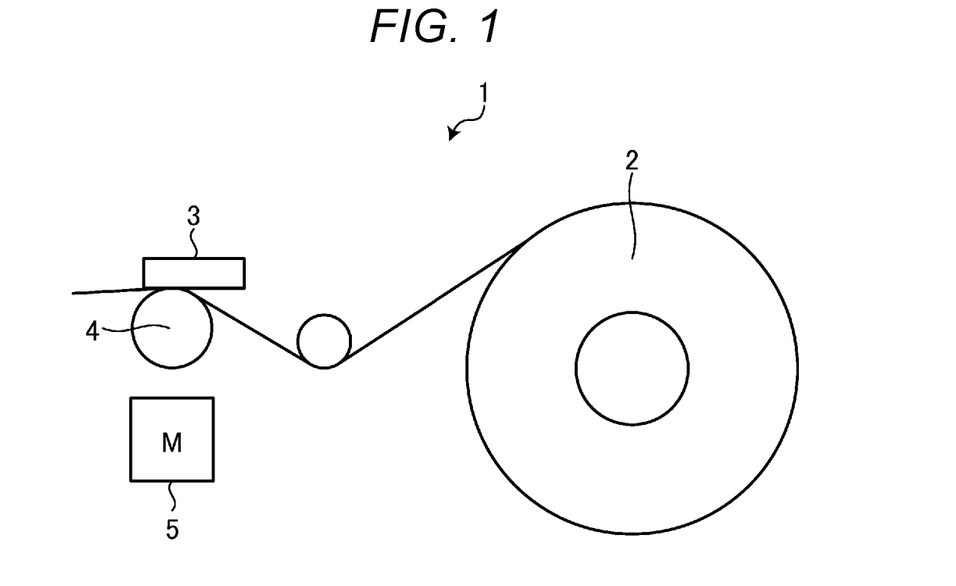
FIG. 1 is a diagram schematically illustrating a configuration of a printer according to at least one embodiment.

An embodiment will be described with reference to the drawings. FIG. 1 is a diagram schematically illustrating a configuration of a printer 1 according to the embodiment. The printer 1 is, for example, a barcode printer, and is used by being installed in a back office of a retail store or a mass retailer. The printer 1 includes a print head 3 that prints on a sheet 2, a platen roller 4 that conveys the sheet 2 sandwiched between the print head 3 and the platen roller 4, a motor 5 that rotationally drives the platen roller 4, and the like.

The print head 3 is, for example, a line thermal head in which a plurality of heat generation elements are linearly disposed. One of indexes directly linked to deterioration (or wear) of the line thermal head is wear of the heat generation elements corresponding to printing. The input for estimating a degree of wear of the heat generation elements includes, for example, a traveling distance of a print medium, paper quality and thickness of paper used as the print medium, and a temperature during operation.

In the platen roller 4, an elastic material such as rubber forms a cylindrical roller surface layer. One of indexes directly linked to deterioration (or wear) of the platen roller 4 is wear or deterioration of the roller surface layer corresponding to printing. The input for estimating a degree of wear or deterioration of the roller surface layer includes, for example, a traveling distance of a print medium, paper quality and thickness of paper used as the print medium, and a temperature during operation.

The motor 5 is, for example, a stepping motor. The input for estimating a degree of deterioration of the motor 5 includes, for example, a rotation speed, an operation time, a sound generated during operation, and a temperature during operation.

The print head 3, the platen roller 4, and the motor 5 described above are shown as representative examples of consumable components included in the printer 1. In addition, the printer 1 includes a large number of components. A life of each component is prescribed, and the components are consumed and deteriorated due to individual causes. The life described above is prescribed with a predetermined safety factor by a manufacturer of the component, for example, and is indicated as a specification or a standard.

The printer 1 records, as needed, the traveling distance of the print medium, the paper quality and the thickness of the paper used as the print medium, the temperature during operation of each unit, the rotation speed of the motor, the operation time, the sound generated by the motor, and the like, which are considered to be the causes of the deterioration of the above-mentioned components.

The above various records are collected together with discarded components by a serviceperson who performs maintenance of component replacement. The serviceperson picks up the collected various records and discarded components and records to an analyst. The analyst determines and records a degree of actual deterioration of each discarded component by visual observation or the like. Then, the analyst collects and stores records of the actual deterioration of the discarded component in a predetermined information processing device together with a record of matters considered to be the causes of the deterioration of the above-mentioned components.

Figure 2:
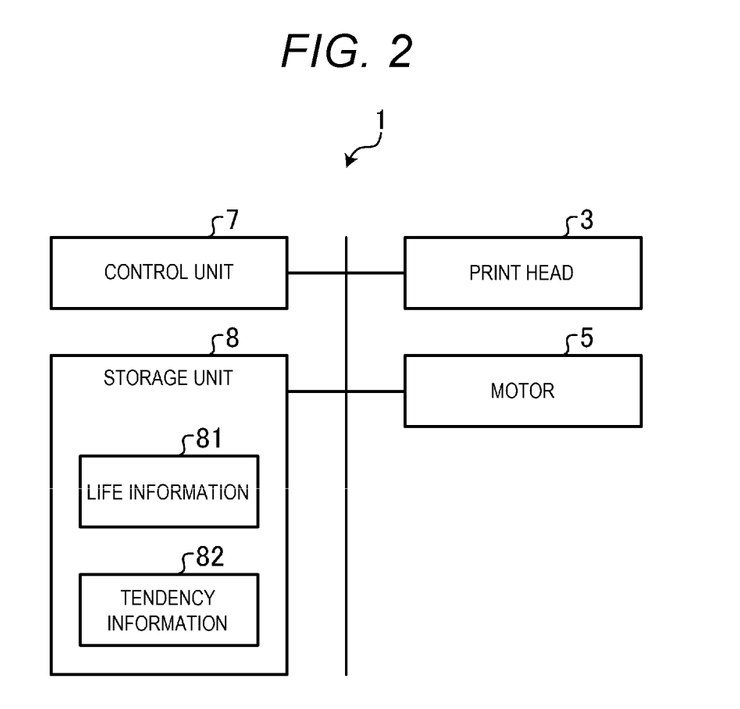
FIG. 2 is a block diagram illustrating an example of electrical connection of units constituting the printer.

FIG. 2 is a block diagram illustrating an example of electrical connection of units constituting the printer 1. The printer 1 further includes a control unit 7 and a storage unit 8. The control unit 7, the storage unit 8, the print head 3, the motor 5, and the like are communicably connected to one another via a bus line or the like.

The storage unit 8 includes a storage medium such as a solid state drive (SSD) or a flash memory, and maintains stored contents even when a power supply is turned off. The storage unit 8 stores various programs that can be executed by the control unit 7 and setting information such as life information 81 and tendency information 82. The life information 81 is information on life, which is prescribed by the manufacturer and has a predetermined safety factor as a specification or a standard of a component, and is an existing replacement recommendation time.

The tendency information 82 is generated based on collection and storage of information on the operation status collected from a plurality of printers and information on the degree of deterioration at a disposal time of the components, and indicates a deterioration tendency of the component with respect to the operation status. More specifically, the tendency information 82 correlates the degree of the actual deterioration of the discarded component determined and recorded by the analyst by visual observation or the like with the record of the matters considered to be the causes of the deterioration of the component. For example, the tendency information 82 indicates a tendency of a degree of an influence on actual deterioration of a matter considered to be a cause of deterioration. The tendency information 82 may be, for example, derived by machine learning or obtained by statistical processing.

The input for machine learning or statistical processing for generating the tendency information 82 includes a record of the actual deterioration of the discarded component collected by the serviceperson and collected and stored in the predetermined information processing device by the analyst, and a record of matters considered to be causes of the deterioration of the component recorded together with the record.

More specifically, in generating the tendency information 82, for example, the record of matters (the traveling distance of the print medium, the paper quality or the thickness of the paper used as the print medium, the temperature during operation of each unit, the rotation speed of the motor, the operation time, the sound generated by the motor, or the like) considered to be the causes of the deterioration of the component is handled as input, and the degree of the actual deterioration of the component (for example, a degree of damage) is handled as output and plotted on a graph. By continuously increasing the number of samples, it is considered that a tendency of deterioration with respect to each matter or a tendency of deterioration under a condition in which a plurality of matters overlap each other appears. Information (for example, a graph, an algorithm, or the like) obtained by the trial is stored in the storage unit 8 as the tendency information 82. By using the tendency information 82, the control unit 7 estimates the degree of deterioration of each component based on the operation status of the printer 1.

Matters (the traveling distance of the print medium, the paper quality or the thickness of the paper used as the print medium, the temperature during operation of each unit, the rotation speed of the motor, the operation time, the sound generated by the motor, or the like) considered to be the causes of the deterioration of the above component, which are recorded by the printer 1 as needed, are stored in a partial area of the storage unit 8.

The control unit 7 includes a central processing unit (CPU), a read only memory (ROM), a random access memory (RAM), and the like. The ROM stores various programs. The RAM is a workspace in which programs or various data are loaded. The CPU is an example of a processor mounted on the printer 1. The CPU loads a program stored in the ROM or the storage unit 8 into the RAM and executes the program, thereby integrally controlling each unit of the printer 1 and implementing various functions.

Figure 3A:
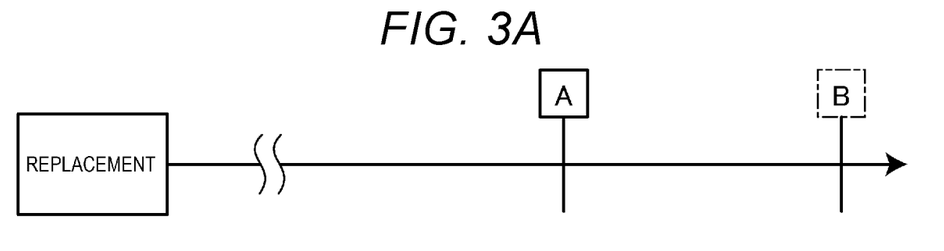
FIGS. 3A and 3B are diagrams illustrating a time at which component replacement is recommended.
Figure 3B:
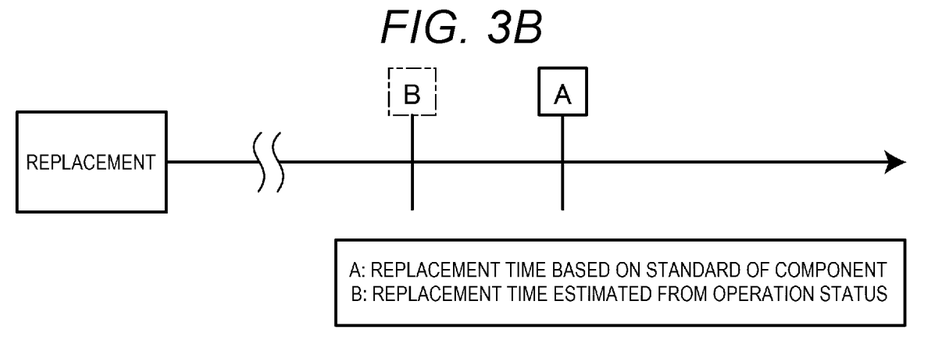

FIGS. 3A and 3B are diagrams illustrating a time at which component replacement is recommended. In the drawing, a horizontal axis represents time.

In FIGS. 3A and 3B, "A" indicates an existing component replacement recommendation time. That is, "A" is a time at which replacement is recommended based on a life (for example, a service life) prescribed for a component. The replacement recommendation time "A" is stored in the storage unit 8 as the life information 81. On the other hand, "B" in FIGS. 3A and 3B indicates a component replacement recommendation time that is output based on the tendency information 82 with the operation status as input.

FIG. 3A illustrates a case where the component replacement recommendation time "B" using the tendency information 82 is later than the existing component replacement recommendation time "A". In addition, FIG. 3B illustrates a case where the component replacement recommendation time "B" using the tendency information 82 is earlier than the existing component replacement recommendation time "A".

In general, since the existing component replacement recommendation time "A" is based on setting in expectation of the safety factor, it is considered that the component replacement recommendation time "B" using the tendency information 82 generated from the degree of the actual deterioration of the component which is replaced in the past is generally later than the time "A" as illustrated in FIG. 3A. However, depending on a usage state of the printer 1, as illustrated in FIG. 3B, the replacement recommendation time "B" may be earlier than "A".

Figure 4:
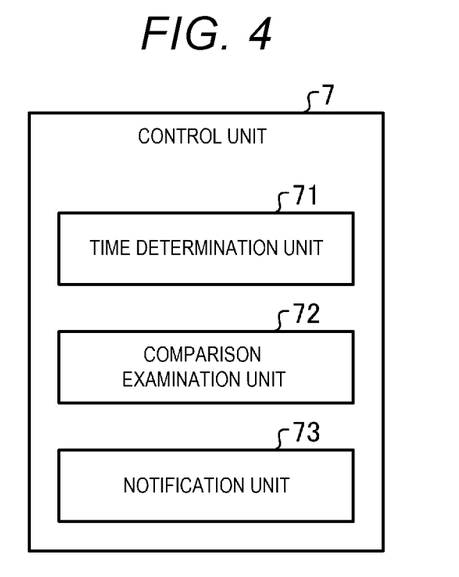
FIG. 4 is a block diagram illustrating an example of functional units included in a control unit.

FIG. 4 is a block diagram illustrating an example of functional units included in the control unit 7. The control unit 7 functions as various functional units such as a time determination unit 71, a comparison examination unit 72, and a notification unit 73 by the CPU executing a program stored in the ROM or the storage unit 8.

The time determination unit 71 determines a time at which component replacement is recommended based on the tendency information 82. More specifically, the time determination unit 71 receives the operation status up to the time point as input and outputs the component replacement recommendation time "B" at the time point based on the tendency information 82. The component replacement recommendation time "B" is a dynamic value and varies according to a history of the operation status until a time point at which the component replacement recommendation time "B" is output.

For example, in the printer 1, when a gentle operation status having a low frequency of use continues until a time point at which a certain value is output and the frequency of use rapidly increases and the operation status intensifies thereafter, the component replacement recommendation time "B" at a time of next output may indicate a time earlier than a previous value. On the contrary, due to a fact that the operation status of the printer 1 rapidly becomes gentle (or low frequency), the component replacement recommendation time "B" may also change to indicate a time later than the previous value.

The comparison examination unit 72 compares the component replacement recommendation time "B" output by the time determination unit 71 with the existing component replacement recommendation time "A", and examines whether the recommendation for component replacement is performed.

For example, the comparison examination unit 72 may recommend component replacement at a time point at which the component replacement recommendation time "B" arrives by prioritizing the component replacement recommendation time "B" at which the degree of the actual deterioration of the component is fed back over the existing component replacement recommendation time "A".

In addition, the comparison examination unit 72 may prioritize prolongation of the life of the component and perform the recommendation based on the component replacement recommendation time "B" only when the component replacement recommendation time "B" is later than the existing component replacement recommendation time "A". That is, when the component replacement recommendation time "B" is earlier than the existing component replacement recommendation time "A", the recommendation is not performed until the existing component replacement recommendation time "A" arrives. The example is employed in an example of a control flow described later with reference to FIG. 5.

Further, when a user of the printer 1 owns a right by paying a fee or the like and makes corresponding setting, the comparison examination unit 72 may perform the recommendation based on the component replacement recommendation time "B". Accordingly, it is possible to contribute to cost collection required for generating the tendency information 82.

The notification unit 73 notifies the user of information on recommendation for component replacement based on an examination result of the comparison examination unit 72. More specifically, when the comparison examination unit 72 determines that the component replacement is recommended, the notification unit 73 notifies the user of a component replacement time by a display device, a speaker, or a buzzer provided in the printer 1.

Figure 5:
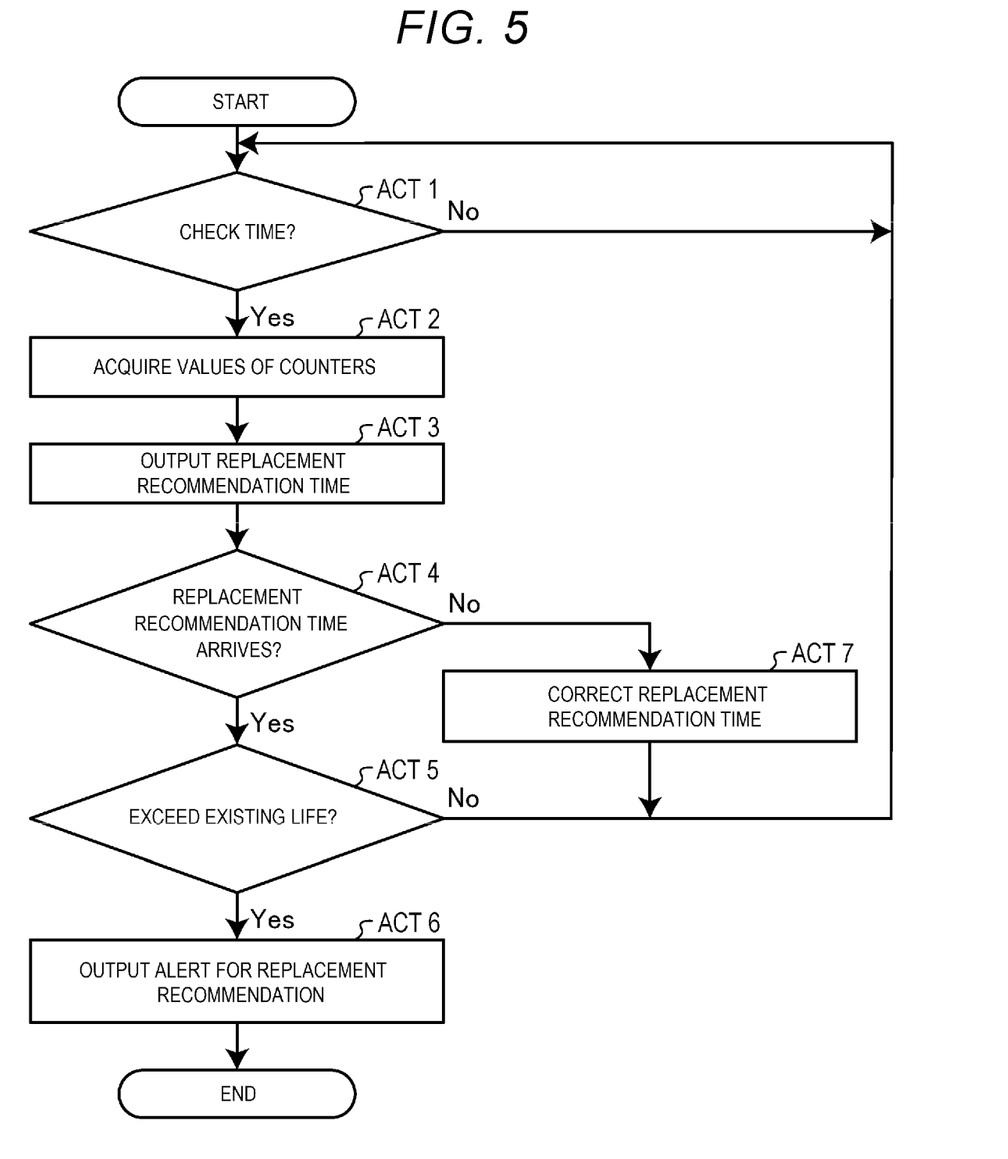
FIG. 5 is a flowchart illustrating an example of a flow of processing performed by the control unit.

By the operations as described above, the control unit 7 optimizes the time at which the component replacement is recommended. FIG. 5 is a flowchart illustrating an example of a flow of processing performed by the control unit 7. The processing is started when the printer 1 is activated.

In the processing, a partial area of the storage unit 8 is used as an area for storing various variables. In addition, in the processing, a current value of a matter considered to be a cause of deterioration of a component or a current value at the component replacement recommendation time "B" based on the tendency information 82 is handled as various variables. Further, an initial value of the current value of the component replacement recommendation time "B" is set to the existing component replacement recommendation time "A".

First, the control unit 7 determines whether a check time of each component arrives (Act 1). In Act 1, at a predetermined period before the component replacement recommendation time "B" for each component, the control unit 7 determines that the check time arrives (Yes in Act 1), and advances the processing to Act 2. The "predetermined period" is a period sufficient for replacement of a target component. When the control unit 7 determines that the check time does not arrive, the control unit 7 waits in Act 1 (No in Act 1).

The control unit 7 acquires values of various counters and stores the values in the storage unit 8 (Act 2). Here, the various counters are counters for observing variable values which are matters considered to be causes of deterioration of a component, and are counters for observing, for example, the traveling distance of the print medium, the rotation speed of the motor, the operation time, and the like. The counter may be a mechanical counter or a counter based on software. Similarly, setting values of the paper quality, the thickness, and the like of the paper used as the print medium, the temperature during operation of each unit, a value of magnitude of the sound generated by the motor, and the like, which are the matters considered to be the causes of the deterioration of the component, may also be acquired in Act 2.

Next, the control unit 7 inputs the various values acquired in Act 2, and outputs the component replacement recommendation time "B" at this time point based on the tendency information 82 (Act 3). Subsequently, the control unit 7 determines whether the component replacement recommendation time "B" output in Act 3 arrives (Act 4). Here, when the component replacement recommendation time "B" arrives (or is exceeded), the control unit 7 advances the processing to Act 5.

In Act 5, the control unit 7 determines whether the component replacement recommendation time "B" output in Act 3 exceeds the existing life (component replacement recommendation time "A"). Here, when the component replacement recommendation time "B" exceeds the existing life (Yes in Act 5), the control unit 7 outputs an alert for recommending component replacement (Act 6). That is, the control unit 7, as the notification unit 73, notifies the user that the time to replace the component arrives.

In Act 4, when it is determined that the component replacement recommendation time "B" output in Act 3 does not arrive (No in Act 4), the component replacement recommendation time "B" is updated to a new value (Act 7), and the processing returns to Act 1.

In Act 5, when the component replacement recommendation time "B" output in Act 3 does not exceed the existing life (component replacement recommendation time "A") (No in Act 5), the control unit 7 returns the processing to Act 1.

As described above, according to the printer 1 of the embodiment, it is possible to recommend component replacement at a time more suitable for an actual situation than that in the existing procedure. That is, in the existing procedure, replacement is recommended at a time based on a life (service life or the like) prescribed for each component in advance. However, according to the embodiment, it is possible to estimate the degree of deterioration of the component according to the usage state of the apparatus (printer 1) into which the component is assembled. Accordingly, it is possible to recommend the replacement of the component at an appropriate time later than the existing life.

As described above, according to the printer 1 of the embodiment, it is possible to appropriately extend the existing replacement recommendation time of the component determined based on the life prescribed for the component.

In the embodiment, for convenience of description, collection of the record of matters considered to be the causes of deterioration of the component and collection and storage of the record of the actual deterioration of the discarded component by the analyst are described. However, after the tendency information 82 is generated from the records, or in the printer 1 including the tendency information 82, collection of the records or the like may not be performed.

Second Embodiment

A second embodiment will be described. The embodiment is a modification of the previous embodiment (the first embodiment), and thus portions different from the previous embodiment will be described, and detailed description of common portions will be omitted.

Figure 6:
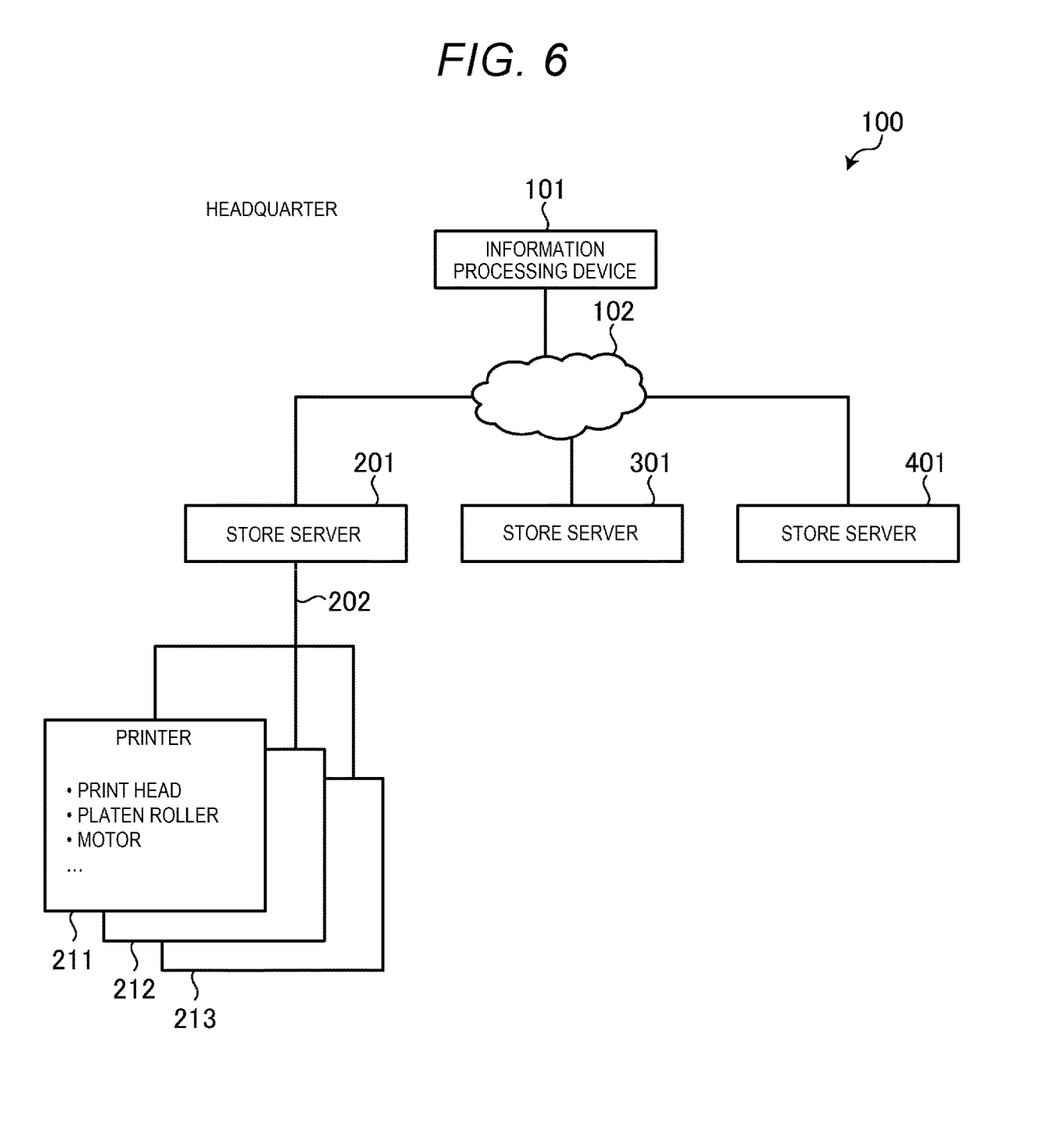
FIG. 6 is a diagram illustrating use of a remote network according to a modification.

FIG. 6 is a diagram illustrating use of a remote network according to the modification. As an example of the embodiment, a system 100 includes an information processing device 101, a network 102, store servers 201, 301, and 401, a local area network (LAN) 202, and printers 211, 212, and 213.

The printers 211, 212, and 213 are similar to the printer 1 according to the previous embodiment, and are installed in the back office of the retail store or the mass retailer. The printers 211 to 213 are connected to the store server 201 via the LAN 202. The store server 201 is connected to the information processing device 101 via the network 102.

Similarly, the store server 301 and the store server 401 are connected to a plurality of printers 1 via the LAN, and are connected to the information processing device 101 via the network 102.

The network 102 is a virtual dedicated line such as a virtual private network (VPN) using a communication line such as the Internet. The information processing device 101 is, for example, a server device having a computer configuration, and stores various types of information in a usable manner.

The previous embodiment describes that, among the information collected and stored to generate the tendency information 82, matters (a traveling distance of a print medium, paper quality and thickness of paper used as the printing medium, a temperature during operation of each unit, a rotation speed of a motor, an operation time, a sound generated by the motor, and the like) considered to be causes of deterioration of a component are collected from the printer 1 by a serviceperson, but in the embodiment, collection by the serviceperson is not performed.

The printer 1 (211 to 213) according to the embodiment performs processing as follows as a function of the control unit 7 by executing a predetermined program stored in a ROM or the storage unit 8. That is, the printer 1 appropriately transmits the information recorded in the storage unit 8 (the matters considered to be the causes of the deterioration of the component) to the store server 201 in correlation with information capable of individually recognizing the printer 1. Transmission timing is, for example, when the printer 1 is activated.

The store server 201 appropriately transmits, to the information processing device 101, the above various types of information (information on the matters considered to be the causes of the deterioration of the component and information capable of individually recognizing the printer 1) received from the subordinate printer 1. Transmission timing is, for example, per day.

The serviceperson collects discarded components, adds information capable of individually recognizing the printer 1, and picks up the discarded components for the analyst. The analyst determines a degree of actual deterioration of the discarded components by visual observation or the like, and records the degree of the actual deterioration in the information processing device 101 in correlation with the information of the printer 1 with which the individually recognizable information matches.

According to such a configuration, the printer 1 itself automatically transmits the information on the matters considered to be the causes of the deterioration of the component, which is recorded by each printer 1 (211 to 213) as needed, to the store server 201, 301, or 401 of a store to which the printer 1 itself belongs. Further, each store server 201, 301, or 401 transmits the information to the information processing device 101. Accordingly, it is possible to collect and store the information on the matters considered to be the causes of the deterioration of the component from a large number of printers 1 without relying on work of the serviceperson. Preferably, work related to the record of the analyst can also be simplified.

A program executed by each device according to the above embodiments is provided by being assembled into a ROM or the like in advance. The program executed by each device according to the above embodiments may also be provided by being recorded in a computer-readable recording medium such as a CD-ROM, a flexible disk (FD), a CD-R, or a digital versatile disk (DVD) in a file in an installable format or an executable format.

Further, the program executed by each device according to the above embodiments may also be stored in a computer connected to a network such as the Internet and provided by being downloaded via the network. The program executed by each device according to the above embodiments may also be provided or distributed via a network such as the Internet.

While certain embodiments have been described, these embodiments have been presented by way of example only, and are not intended to limit the scope of the inventions. These novel embodiments may be embodied in a variety of other forms; various omissions, substitutions, and changes may be made without departing from the spirit of the inventions. These embodiments and the modifications thereof fall within the scope and spirit of the invention and are included in the scope of the inventions recited in the claims and the equivalent thereof.

What is claimed is:

1. A printer comprising:
a timer configured to determine a time at which replacement of a component is recommended based on tendency information indicating a deterioration tendency of the component with respect to an operation status, the tendency information being generated from collection and storage of information on the operation status collected from a plurality of printers and information on a degree of deterioration at a disposal time of the component;
a comparator configured to compare the time output by the timer with a predetermined life of the component, and to examine whether to perform recommendation for component replacement; and
a notifier configured to notify of information on the recommendation for component replacement based on an examination result of the comparator.

2. The printer according to claim 1, wherein
the comparator performs the recommendation based on the time output by the timer, when the time is later than the predetermined life.

3. The printer according to claim 1, wherein
the comparator performs the recommendation based on the time output by the timer, when a setting is made corresponding to a user owning a right.

4. The printer according to claim 1, wherein
the information on the degree of deterioration includes at least one of a traveling distance of a print medium, a paper quality or a thickness of a paper used as the print medium, a temperature during operation of the component, a rotation speed of a motor, an operation time, and a sound generated by the motor.

5. The printer according to claim 1, wherein
the tendency information is obtained by machine learning or statistical processing.

6. The printer according to claim 1, wherein
the predetermined life of the component includes a predetermined safety factor as a specification or a standard of the component.

7. The printer according to claim 1, wherein
the operation status includes a frequency of use of the printer.

8. The printer according to claim 1, wherein
the notifier is configured to notify by at least one of a display device, a speaker, and a buzzer.

9. The printer according to claim 1, wherein
the printer is configured to transmit the information on the degree of deterioration to a store server of a store to which the printer belongs.

10. A component replacement recommendation method for a computer included in a printer, the method comprising:
determining, by a timer, a time at which replacement of a component is recommended based on tendency information indicating a deterioration tendency of the component with respect to an operation status, the tendency information being generated from collection and storage of information on the operation status collected from a plurality of printers and information on a degree of deterioration at a disposal time of the component;
comparing, by a comparator, the time output by the timer with a predetermined life of the component, and to examine whether to perform recommendation for component replacement; and
notifying, by a notifier, of information on the recommendation for component replacement based on an examination result of the comparator.

11. The method according to claim 10, further comprising performing, by the comparator, the recommendation based on the time output by the timer, when the time is later than the predetermined life.

12. The method according to claim 10, wherein:
performing, by the comparator, the recommendation based on the time output by the timer, when a setting is made corresponding to a user owning a right.

13. The method according to claim 10, wherein:
the information on the degree of deterioration includes at least one of a traveling distance of a print medium, a paper quality or a thickness of a paper used as the print medium, a temperature during operation of the component, a rotation speed of a motor, an operation time, and a sound generated by the motor.

14. The method according to claim 10, wherein:
the tendency information is obtained by machine learning or statistical processing.

15. The method according to claim 10, wherein:
the predetermined life of the component includes a predetermined safety factor as a specification or a standard of the component.

16. The method according to claim 10, wherein:
the operation status includes a frequency of use of the printer.

17. The method according to claim 10, wherein:
the notifier notifies by at least one of a display device, a speaker, and a buzzer.

18. The method according to claim 10, further comprising:
transmitting the information on the degree of deterioration to a store server of a store to which the printer belongs.

* * * * *